J. T. MAYBURY.
Apparatus for Drying Meal, Flour, Grain, &c.

No. 207,051. Patented Aug. 13, 1878.

WITNESSES:
W. W. Hollingsworth
Edw. W. Byrn.

INVENTOR:
Joseph T. Maybury
BY
ATTORNEYS.

UNITED STATES PATENT OFFICE.

JOSEPH T. MAYBURY, OF NEW ORLEANS, LOUISIANA.

IMPROVEMENT IN APPARATUS FOR DRYING MEAL, FLOUR, GRAIN, &c.

Specification forming part of Letters Patent No. 207,051, dated August 13, 1878; application filed April 29, 1878.

*To all whom it may concern:*

Be it known that I, JOSEPH THOMAS MAYBURY, of New Orleans, in the parish of Orleans and State of Louisiana, have invented certain new and useful Improvements in Apparatus for Drying Meal, Flour, Grain, &c.; and I do hereby declare that the following is a full, clear, and exact description thereof, which will enable others skilled in the art to which it pertains to make and use the same, reference being had to the accompanying drawings, and to the letters of reference marked thereon, which form a part of this specification, and in which—

Figure 1:
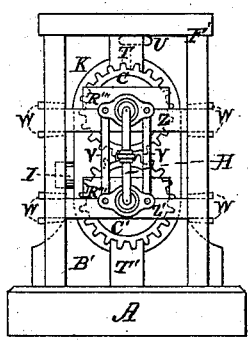
Figure 2:
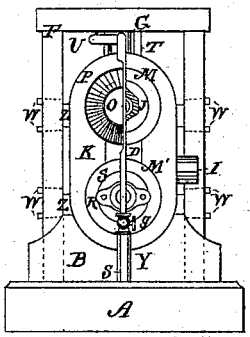
Figure 3:
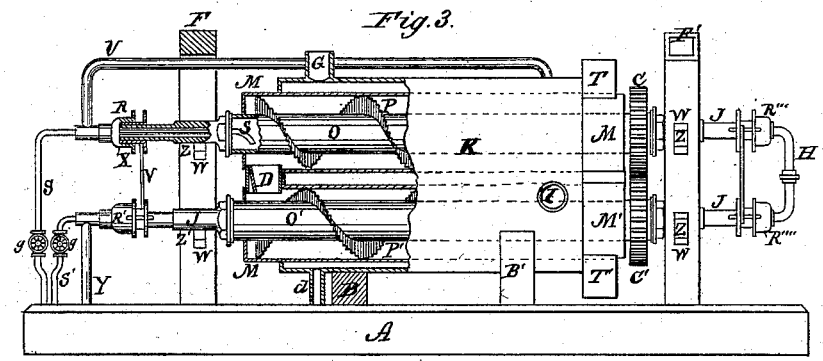
Figure 4:
Figure 5:
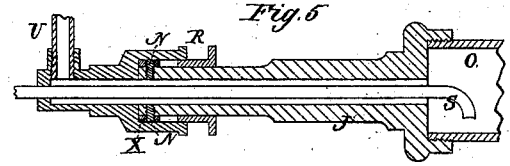
Figure 6:
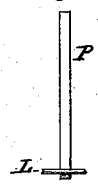
Figure 7:
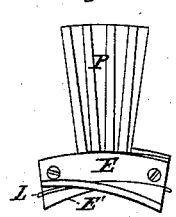
Figure 8:

Figures 1 and 2 are end elevations of the apparatus; Fig. 3, a side elevation and partial section; Fig. 4, a transverse section of adjustable ring or collar and hollow journal; Fig. 5, a longitudinal section of the same; Fig. 6, a section of the spring-flights; Fig. 7, a longitudinal view of a portion of spiral; Fig. 8, section of same.

This invention relates particularly to that class of apparatus known as "steam grain and meal driers," or others of similar construction, extensively used for drying grain, meal, or other like substances, wherein a series of flights or spirals, revolving within cylinders, are made to convey the substance to be dried, while steam is acting on the exterior of the cylinders and also in the interior of the hollow shafts of said spiral conveyers.

My invention consists in the combination, with a closed containing-case, of a hollow shaft for containing steam, having thereon a series of spring-fingers, arranged close together and in spiral form, to form both a conveyer and a brush for flirting and distributing the materials to be dried.

It also consists in the arrangement of the reduced hollow journals and stuffing-boxes for producing a steam-tight joint with little friction.

The invention also further consists in making the spiral conveyer laterally adjustable to make the spiral elastic brush bear against its containing-case on one side and be free from contact on the opposite side, to distribute the materials by a flirting or slapping movement of the elastic brushes.

The invention consists, finally, in the general construction and arrangement of the device, as hereinafter fully described.

To enable others skilled in the art to make and use my invention, I will proceed to describe its construction and operation.

In the accompanying drawings I have represented a well-known form of steam grain-drier with my improvements applied to it, and in which A represents the base of the apparatus; B B', standards supporting the steam-chest K; C C', gear-wheels made fast on the hollow shafts O O'; D, inclined plane in the charging-hopper or spout of each of the cylinders, for the purpose of projecting the substance to be dried forward on the flights, and thus prevent accumulation in the ends of cylinders M, beyond the reach of the conveyers.

E E', Figs. 7 and 8, are angle spirals, between which the flight-springs P P', being previously strung by their bights on the wire L, are made fast; F F', rectangular frames supporting the journals of hollow shafts O O'; G, pipe leading exhaust-steam from steam-chest K; H, pipe connecting hollow shafts O O'; I, inlet steam-pipe conveying the exhaust-steam of the steam-engine into the steam-chest K; J J J J, hollow cast-iron journals screwed on the ends of the hollow shafts O O', the ends of which revolve in the stuffing-boxes R R' R''' R''''; Y, pipe admitting live-steam from the boiler into and through the stuffing-boxes R and hollow journals J and hollow shafts O O' by means of the connecting-pipe H, and through the pipe U into the steam-chest K; S S', siphons for draining the hollow shafts O O'; X, Figs. 4 and 5, a collar made fast on hollow journal J by screws N N after the gland has been slipped on before introducing it into the stuffing-box R. V V V V are links placed between the stuffing-boxes R R' and R''' R'''', as shown at Figs. 1 and 3, for the purpose of preventing said boxes from turning with the hollow shafts O O'; Z Z Z Z, cross-pieces sliding in the frames F F, carrying boxes for journals J J J J. W W W, &c., are wedges placed above and below the cross-pieces Z for the purpose of regulating the position of the conveyers within the cylinders M M', whereby the elastic flights may be made to brush the interior sides and bottom of said cylinders with more or less force, thus preventing small portions of the meal or other substance sticking to the said bottom or sides until scorched, and then becoming detached and mixing with and spoiling a whole batch—a vital objection which attaches to all other steam and kiln driers.

The operation is as follows: The chest K is filled with steam from the exhaust of the engine running the mill, and steam from the boiler is admitted through Y into shaft O', through H into shaft O, thence through U into steam-chest K, from which the steam escapes through the pipe G. The condensed steam is drained from the chest K through the pipe $d$, and from the hollow shafts O O' through the siphons S S by means of the valves $g$ $g$. The conveyers having been regulated so as to brush the bottom of the cylinders M, and the shafts caused to revolve, the material to be dried is introduced through the spout T into the upper cylinder, M, through which it is carried by the spring-flights P, the springs of which are slightly sprung backward in consequence of rubbing against the lower interior portion of the cylinder; but as each spring revolves from the bottom upward, it becomes suddenly released from tension, and gives a slap, by reason of its elasticity, to the material, causing it to thoroughly mix, and changes the relative position of each particle thereof, thereby bringing every portion of the same in contact with the heated surfaces by this action of the spring-flights, independent of their ordinary motion of translation. When the material arrives at the end of cylinder M it falls on the incline plane at D, by which it is projected on the spiral P' and conveyed through cylinder M' to exit-spout T', in the manner above described. The number of cylinders may be increased, or a single cylinder may be used, as circumstances may require. The spirals are of regular pitch in all the cylinders, inclined in the same direction and geared with wheels of equal diameters. The passing of the substance through the apparatus is therefore regular, while the complete stirring and mixing by the spring-flights drives the material in a thorough manner through its whole mass, without the possibility of scorching any part of it.

In defining my invention more clearly, I would state that I do not broadly claim a spiral brush for a grain-drier, as this is not new, but only a hollow shaft for containing steam when provided with the spiral brush and combined with a tightly-inclosed case, whereby the meal or grain is more effectually distributed and the heat more uniformly applied.

Having described my invention, what I claim, and desire to secure by Letters Patent, is—

1. The combination, in a grain-drier with a tight inclosing-case, of a hollow shaft for containing steam, having a spiral flight of elastic spring-fingers adapted to operate as a conveyer, as a brush, and as a distributer for the materials, substantially as described.

2. The reduced hollow cast-iron journals J J J J, screwed to the ends of the hollow shafts O O', and having a collar, X, at the opposite extremity, secured by screws N and working in stuffing-boxes R R, said stuffing-boxes being prevented from turning by the links V V, substantially as and for the purpose described.

3. The combination, with a tight inclosing-case, of a shaft having spiral flights of spring-fingers, and made eccentrically adjustable, as described, to cause the flights to bear more or less upon one side and be free upon the other, for the purpose described.

4. The combination of an incasing steam-jacket, K, two or more cylinders, M M', hollow shafts O O', provided with spiral brush-conveyers P, hollow journals J J, connecting-pipe H, and siphon-pipes S S', substantially as and for the purpose described.

In testimony that I claim the foregoing as my own invention I affix my signature in presence of two witnesses.

JOSEPH THOMAS MAYBURY.

Attest:
ANDREW HERO, Jr.
WM. CAMPBELL.